June 12, 1928.
J. W. FAY
1,673,281
METHOD OF AND APPARATUS FOR DISPENSING MATTER
Filed Aug. 9, 1924
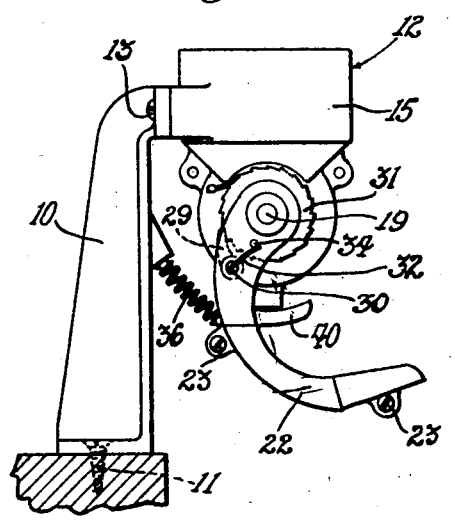
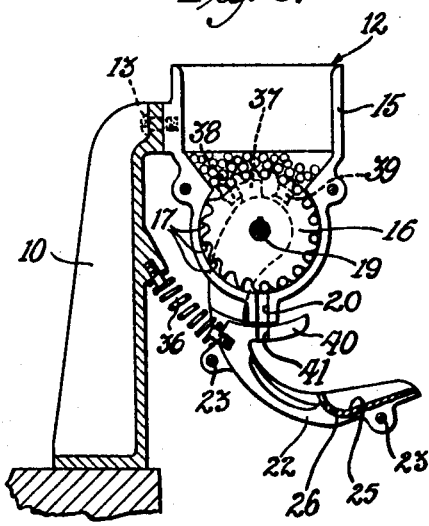
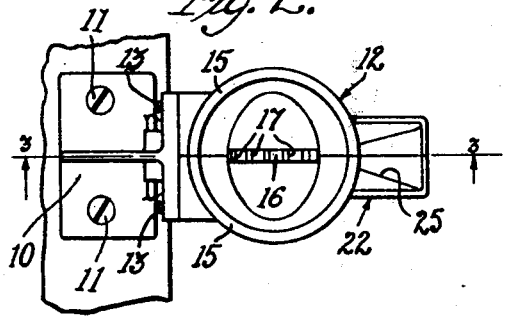
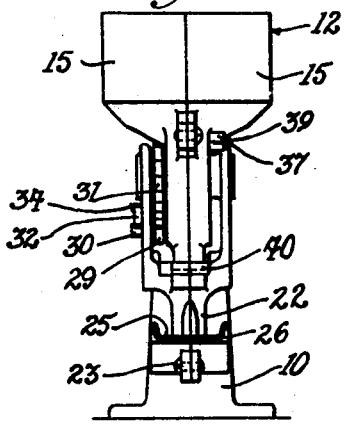
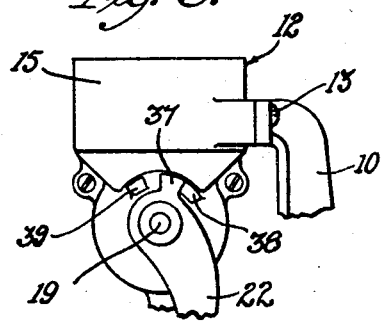
Inventor
Joseph William Fay Patented June 12, 1928.

1,673,281

UNITED STATES PATENT OFFICE.

JOSEPH WILLIAM FAY, OF VILLA PARK, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR DISPENSING MATTER.

Application filed August 9, 1924. Serial No. 731,178.

This invention relates to a method of and apparatus for dispensing matter, and has for its primary object the provision of a method of an apparatus for dispensing matter which requires a minimum of effort on the part of the operator.

Another object of the invention is to provide dispensing apparatus operable by a tool which is adapted to receive the matter dispensed by the apparatus.

In one form of the invention the improved method is practiced by means of apparatus adapted to dispense predetermined quantities of solder. The apparatus comprises a hopper for holding a supply of pellets of solder and means including an actuating member for withdrawing the pellets one at the time from the hopper and depositing them in a recess or pocket formed in the actuating member. The pellets may be picked up from the recess or pocket by the heated tip of a soldering iron, the recess or pocket being lined with material to which the solder adheres to a less degree than it does to the tip of the soldering iron. The construction of the apparatus is such that the soldering iron may be employed to operate the apparatus when a pellet of solder is removed from the pocket in the actuating member.

Other objects and features of the invention will become apparent as the detailed description progresses, reference being had to the accompanying drawing, wherein Fig. 1 is a side elevation of apparatus embodying the invention and adapted to dispense predetermined quantities of solder;

Fig. 2 is a plan view of the apparatus shown in Fig. 1;

Fig. 3 is a section taken on line 3—3 of Fig. 2;

Fig. 4 is a front elevation of the improved apparatus, and

Fig. 5 is a fragmentary side elevation illustrating certain details of the improved apparatus. It is believed that a complete understanding of the improved method will be had from a detailed description of the apparatus whereby the method is practiced.

Referring to the drawing, the improved apparatus comprises a bracket 10 which may be secured to a work table or the like by screws 11. A hopper 12 is secured to the bracket 10 by a plurality of machine screws 13 and consists of a pair of complementary members 15 which are recessed to receive a disc 16 having a plurality of notches 17 in its periphery. The disc 16 is keyed to a shaft 19 rotatably journaled in the complementary members 15 and, when rotated, will withdraw solder from the hopper 12 and deliver it to a dispensing aperture 20 formed in the complementary members 15. The solder is preferably in pellet form, each pellet being provided with a core of fluxing material as more particularly described in Patent 1,636,175, issued July 19, 1927.

Pivotally mounted on the shaft 19 is a bifurcated actuating lever 22 which in this instance is formed of two castings secured to each other by bolts or screws 23. A recess or pocket 25 formed in the free end of the actuating lever 22 is provided with a lining 26 of some material to which fused solder adheres to a less degree than it does to the heated tip of a soldering iron. A pawl 29 secured to one end of a pin 30 pivotally mounted in one of the bifurcations of the lever 22 is yieldingly held in engagement with a ratchet 31 through the medium of a leaf spring 32 which has one of its ends secured in the pin 30 and has the other of its ends resting against a pin 34 projecting from the lever 22. The ratchet 31 is rigidly secured to the shaft 19. The actuating lever 22 may be oscillated to advance the ratchet 31 and the disc 16 in a step-by-step manner. A compression spring 36 tends to hold the actuating lever 22 in a position wherein a lug 37 formed upon one of the bifurcations of the lever will engage a stop 38 formed upon one of the complementary members 15 (Fig. 5). Angular displacement of the lever 22 is also limited by a stop 39 adapted to engage the lug 37 when the lever is angularly displaced in a clockwise direction (Fig. 1) in a manner hereinafter described.

Referring to Fig. 3 the actuating lever 22 is provided with an arcuate flange 40 having an aperture 41 adapted to register with the dispensing aperture 20 when the actuating lever is in the position wherein it is shown in Figs. 1, 2, and 5. However, should the lever 22 be displaced in a clockwise direction (Fig. 3) the flange 40 will close the dispensing aperture 20 and a pellet of solder delivered to the dispensing aperture will not pass therefrom until the actuating lever is again returned to its normal position by the compression spring 36.

In the operation of the device a supply of solder in the aforementioned pellet form is placed in the hopper 2. The pellets of solder enter the notches 17 of the disc 16 which is rotated in a step-by-step manner by means of the actuating lever 23 until one of the pockets 17 delivers a pellet of solder to the dispensing aperture 20 from which it falls through the aperture 41 in the flange 40 and into the pocket 25. The operator then inserts the heated tip of a soldering iron into the pocket 25 and the solder fuses and adheres thereto. The operator simultaneously employs the soldering iron to operate the apparatus, the soldering iron being forced against the actuating lever 22 to bring it into the position wherein the lug 37 engages the stop 39 (Fig. 5). This act causes another pellet of solder to be delivered to the dispensing aperture 20 and to come to rest upon the arcuate flange 40. When the operator withdraws the soldering iron from the pocket 25 the spring 36 returns the actuating lever to its normal position and the ball of solder resting against the flange 40 passes through the aperture 41 and into the pocket 25 to replace the solder withdrawn therefrom by the operator.

What is claimed is:

1. In apparatus for dispensing spherical pellets of solder, a hopper for holding a supply of pellets, a rotatable member having a plurality of pellet receiving peripheral openings, a housing having a discharge opening at the bottom thereof, said rotatable member designed to selectively separate the pellets from the supply thereof in the hopper and convey them individually and in spaced relation within the housing to the discharge opening, an actuating lever operatively connected with the rotatable member to effect intermittent rotation thereof and discharge of a pellet upon successive engagements therewith of a soldering tool, a pellet and tool receiving pocket provided on the lever, and a yielding means for retaining the lever in a predetermined position upon the withdrawal of the soldering tool.

2. The method of dispensing material to a tool, which consists in bringing the tool into contact with a quantity of said material previously disposed in a position to permit access thereto and direct contact therewith by the tool, and in contemporaneously moving the tool bodily to cause another quantity of said material to be fed to the above mentioned position.

3. The method of dispensing soldering material to a heated soldering tool, which consists in bringing the tool into contact with a quantity of said material previously disposed in a predetermined position to permit free access thereto and direct contact therewith by the tool, and in contemporaneously moving the tool bodily to cause another quantity of said material to be fed to said predetermined position when the tool is withdrawn therefrom.

4. Dispensing apparatus for soldering tools comprising means for holding a supply of matter to be dispensed, means for withdrawing said matter from the first-mentioned means, and common means for actuating the last-mentioned means upon bringing a soldering tool into operative association therewith and for receiving and retaining said matter upon the withdrawal of the tool in an exposed position to be subsequently engaged by the tip of the soldering tool.

5. Dispensing apparatus for soldering tools comprising rotatable means for withdrawing a predetermined quantity of matter from a supply thereof, and a member for actuating said rotatable means upon bringing a soldering tool into operative association therewith and retain said predetermined quantity of matter upon the withdrawal of the tool in an exposed position to be subsequently engaged by the tip of the soldering tool.

6. Dispensing apparatus for soldering tools comprising means for holding a supply of matter to be dispensed, rotatable means for withdrawing the matter from the first-mentioned means, and a pivotally mounted lever for actuating the rotatable means upon bringing a soldering tool into operative association therewith and for receiving and retaining the matter withdrawn thereby upon the withdrawal of the tool in an exposed position to be subsequently engaged by the tip of the soldering tool.

7. Dispensing apparatus for soldering tools comprising a hopper for holding a supply of working material, a rotatable member for withdrawing said working material from the hopper, a ratchet rigidly secured to said rotatable member, means adapted to receive said working material from said rotatable member and retain said working material in position to receive the tip of a soldering tool, and a pawl mounted on said last-mentioned means and adapted to engage said ratchet.

8. In apparatus for dispensing spherical pellets of solder, means for withdrawing a pellet of solder from a supply thereof, and means for actuating said first-mentioned means upon bringing a soldering tool into association therewith and adapted to receive the pellet of solder so withdrawn from the supply thereof upon the withdrawal of the soldering tool, said actuating means including a pellet receiving pocket comprising material to which solder adheres to a less degree than it does to the soldering iron.

In witness whereof, I hereunto subscribe my name this 31 day of July, A. D., 1924.

JOSEPH WILLIAM FAY.